(12) United States Patent
Holmes

(10) Patent No.: US 12,241,801 B2
(45) Date of Patent: Mar. 4, 2025

(54) SENSOR DEVICE HAVING FIRST AND SECOND CORRUGATED DIAPHRAGMS FOR DETERMINING DIFFERENTIAL PRESSURE IN LIQUID OR GASEOUS MEDIA

(71) Applicant: ABB Schweiz AG, Baden (CH)

(72) Inventor: Andrew Holmes, Reading (GB)

(73) Assignee: ABB Schweiz AG, Baden (CH)

( * ) Notice: Subject to any disclaimer, the term of this patent is extended or adjusted under 35 U.S.C. 154(b) by 375 days.

(21) Appl. No.: 17/843,406

(22) Filed: Jun. 17, 2022

(65) Prior Publication Data
US 2022/0404224 A1    Dec. 22, 2022

(30) Foreign Application Priority Data
Jun. 18, 2021   (EP) .................................. 21180355

(51) Int. Cl.
  *G01L 13/02*  (2006.01)
  *G01L 19/14*  (2006.01)
(52) U.S. Cl.
  CPC ............ *G01L 13/026* (2013.01); *G01L 19/14* (2013.01)
(58) Field of Classification Search
  None
  See application file for complete search history.

(56) References Cited

U.S. PATENT DOCUMENTS 4,665,753 A * 5/1987 Bertrand ................. G01L 9/007
                                                        73/706
5,209,118 A    5/1993 Jerman
10,591,377 B2 * 3/2020 Funken ............... G01L 19/0046
(Continued)

FOREIGN PATENT DOCUMENTS

| EP | 2189773 A2 | 5/2010 |
| EP | 3299788 A2 | 3/2018 |
| JP | 2003-19717 A | 1/2003 |

OTHER PUBLICATIONS

Werner et al., "Kostengünstige Nass/Nass-Differenzdruckmessung", *GMA/ITG-Fachtagung Sensoren und Messsysteme 2019*, 566-572 pp. (Jun. 25-26, 2019).

(Continued)

*Primary Examiner* — Peter J Macchiarolo
(74) *Attorney, Agent, or Firm* — Leydig, Voit & Mayer, Ltd.

(57) ABSTRACT

A sensor device includes a housing frame defining a first opening and a second opening; a sensing element having first and second sides is disposed within the housing frame and defines therein a first cavity at its first site and a second cavity at its second site, wherein the sensing element determines a differential pressure between the first and second sides; a first corrugated diaphragm configured to close the first opening to seal the first cavity, and a second corrugated diaphragm configured to close the second opening to seal the second cavity; and an inert hydraulic fluid disposed within the first and second cavities that fluidly couples an external pressure acting on the respective corrugated diaphragm to the respective side of the sensing element, wherein the first corrugated diaphragm and the second corrugated diaphragm is built by a conformal coating process using a substrate with structured surface.

15 Claims, 4 Drawing Sheets

(56) References Cited

U.S. PATENT DOCUMENTS

2004/0060174 A1 4/2004 Imafuji et al.
2018/0136066 A1 5/2018 Wagner et al.

OTHER PUBLICATIONS

European Patent Office, Extended European Search Report in European Application No. 21180355.6, 13 pp. (Feb. 16, 2022).
Keller, "Series PD-10LHP," downloaded from the Internet on Sep. 13, 2022, at https://keller-druck.com/en/products/pressure-transducers/oem-differential-pressure-transducers/series-pd-10lhp, 6 pp. (2022).

* cited by examiner

SENSOR DEVICE HAVING FIRST AND SECOND CORRUGATED DIAPHRAGMS FOR DETERMINING DIFFERENTIAL PRESSURE IN LIQUID OR GASEOUS MEDIA

CROSS-REFERENCE TO RELATED APPLICATIONS

This patent application claims priority to European Patent Application No. 21180355.6, filed on Jun. 18, 2022, which is incorporated herein in its entirety by reference.

BACKGROUND OF THE INVENTION

The vast majority of commercial pressure sensors employ a silicon microelectromechanical system (MEMS) device as the sensing element. In a typical MEMS pressure sensor chip, a portion of the silicon substrate is removed by etching from the underside, leaving a thin silicon membrane at the top surface. A differential pressure between top and bottom will cause the membrane to deflect, and the resulting stresses in the membrane can be measured by piezo-resistors placed on the membrane periphery. By choosing the membrane area and thickness appropriately, the full-scale differential pressure range can be varied from several mbar to tens of bar.

Silicon pressure sensors may be designed for either absolute or gauge/differential pressure measurement. In the former case, a zero-pressure reference cavity is formed on the underside of the membrane by attaching a back plate to the underside of the substrate under vacuum. Typically, the back plate is made from a glass that has a coefficient of thermal expansion closely matched to that of silicon. In the case of a gauge or differential sensor, it is common practice to attach a back plate with a hole to provide access to the underside of the membrane. The back plate increases the mechanical rigidity of the sensor chip.

Many applications for silicon pressure sensors involve relatively inert, dry gases, and in such applications, both sides of the sensor can be exposed directly to the process medium. The underside of a silicon sensor can also typically be exposed to other media, including both dielectric and electrically conductive liquids, provided they are not corrosive to silicon or glass. However, the range of media that can come into contact with the top side of a silicon sensor is more restricted. In particular, water and aqueous media are excluded because the exposed electrical connections to the piezo-resistors will lead to electrolysis and corrosion when in contact with a conducting fluid.

BRIEF SUMMARY OF THE INVENTION

A common approach to making a wet-wet differential pressure sensor that can be operated in conductive or corrosive liquids is to encapsulate the silicon sensor chip in such a way as to isolate the top side of the silicon chip from the process medium while still allowing coupling of the external pressure to the membrane. In a typical configuration, closed cavities are formed on both sides of the sensor chip, with each cavity being closed off by a corrugated diaphragm, which will deflect in response to external pressure changes. The cavities are filled by an inert hydraulic fluid, for example silicone oil, so that the volume of each cavity is fixed; in this way, displacements of the diaphragms and the silicon membrane are coupled.

Typically, sensors of that type have stainless steel housings produced by traditional machining and corrugated diaphragms made by embossing stainless steel sheet. The smallest devices available commercially have a volume of around 10 cm3 and a diaphragm size of around 2 cm diameter. In order for the diaphragm to transmit external pressure changes to the silicon membrane with negligible attenuation, the stiffness of the diaphragm must be low compared to that of the membrane. This requirement sets a lower limit on the diaphragm diameter for a given diaphragm thickness. The diaphragms in commercial sensors typically have a thickness of around 20 μm. Use of a thinner diaphragm would allow a reduction in the diaphragm diameter, but this is impractical with the methods currently used for diaphragm manufacture.

Embodiments of the present disclosure relate to a sensor device for determining differential pressure in liquid or gaseous media, a method for manufacturing a corrugated diaphragm, and a method for sealing a cavity of a sensor device with subject matter as described in the independent claims.

Advantageous modifications of the are described in the dependent claims. All combinations of at least two of the features disclosed in the description, the claims, and the figures fall within the scope of the invention. In order to avoid repetition, features disclosed in accordance with the method shall also apply and be claimable in accordance with mentioned systems.

BRIEF DESCRIPTION OF THE SEVERAL VIEWS OF THE DRAWING(S)

The accompanying drawings, which are included to provide a further understanding of the disclosure and are incorporated in and constitute a part of this application, illustrate embodiments of the invention and together with the description serve to explain the principle of the invention.

DETAILED DESCRIPTION OF THE INVENTION

Figure 1:
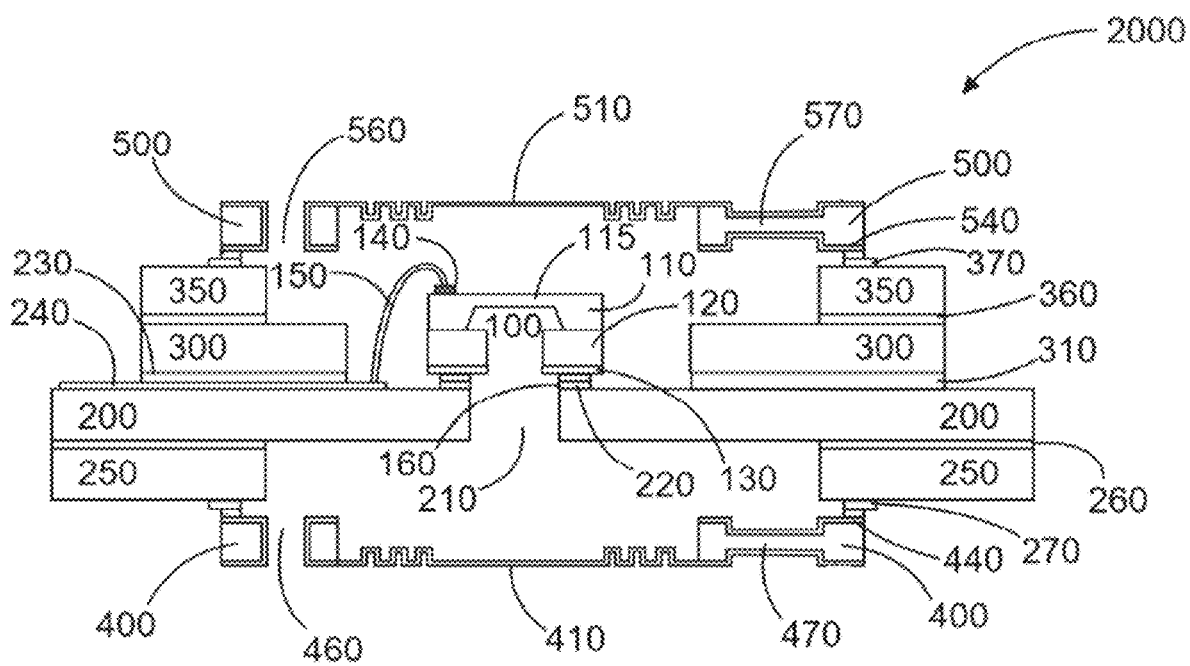
FIG. 1 is a schematic illustration of a cross-sectional view of a sensor device in accordance with the disclosure.

FIG. 1 sketches schematically a cross-sectional view of a sensor device 2000 prior to filling cavities of the sensor device 2000 with hydraulic fluid. The sensing element 100 can be a standard MEMS piezo resistive gauge/differential pressure sensor chip comprising a silicon die 110 which has been locally thinned to provide a membrane 115, and wherein the silicon die 110 is mounted to its back plate 120 with a hole for access to a second side of the sensing element.

Electrical connections to the sensing element are made via a plurality of metal contact pads 140 on the top surface of the sensor chip.

The sensor device 2000 is constructed from a stack of four ceramic plates 200, 250, 300, 350, which are building a housing frame, a metal bottom plate 400 and a metal top plate 500. The ceramic plates 200, 250, 300, 350 are designed as to create cavities at both sides of the sensor chip 100 that are closed off by the corrugated diaphragms 410, 510. The corrugated diaphragms 410, 510 include filling holes 460, 560, that means an opening for providing hydraulic fluid to the cavity, which are configured to be sealed by a plug, and thinned regions 470, 570 to facilitate initial balancing of the cavity pressures during factory calibration.

The sensor chip 100 is mounted with its back plate 120 on a first ceramic plate 200 using a die attachment method known in the art. For example, if the sensor chip 100 is supplied with a solderable metal layer 130 on the underside, and a solderable metal layer 220 is deposited on the ceramic plate, the sensor chip 100 may be attached by reflow soldering. Alternatively, if the metal layers 130 and 220 are suitable for solid-state bonding, then thermosonic die attachment may be employed. As a third option for the die attachment an adhesive can be used, preferably a case where the metal layers 130 and 220 may be omitted. With either solder or adhesive attachment, the resulting joint between the sensor chip and the ceramic plate will include a layer of bonding material 160, which will not be present in the case of thermosonic attachment.

The method of chip attachment may have some effect on the thermal drift of the packaged sensor. Whichever method is employed, the joint must form a seal around the hole 210 in the ceramic plate, in order to provide a separation between the first and the second cavity. The ceramic plate 200 can also include a plurality of metal tracks 230 running from the vicinity of the sensor chip to contact pads 240 at the periphery of the plate. Each metal track 230 is connected to one or more of the contact pads 140 on the sensor chip 100 via one or more bonding wires 150.

Two further ceramic plates 300, 350 with apertures to accommodate the sensor chip 100 are stacked on top of the first ceramic plate 200 to form the first cavity. A fourth apertured ceramic plate 250 is attached to the underside of the first ceramic plate 200. The aperture in the fourth ceramic plate, the hole in the first ceramic plate, and the internal cavity of the sensor chip together form the second cavity. The dimensions of the aperture in the fourth ceramic plate are chosen such that the volumes of the first and second cavities are equal. This is essential to minimize the thermal drift in the sensor due to thermal expansion of the hydraulic fluid.

The ceramic plates 200, 250, 300, 350 may be joined together using any of several techniques that are known in the art. For example, glass frit bonding can be employed if all materials present can withstand the required process temperature of around 450° C.

Alternatively, lower temperature adhesive bonding can be used. A third option for joining the ceramic plates 200, 250, 300, 350 is reflow soldering, if suitable metal coatings are applied to the respective surfaces of the ceramic plates 200, 250, 300, 350. Preferably the ceramic plates 200, 250, 300, 350 should first be bonded together in pairs, with e.g. ceramic plate 200 being bonded to ceramic plate 250 and ceramic plate 300 being bonded to ceramic plate 350. Sensor chip attachment and wire bonding may then be carried out, followed by bonding together of ceramic plates 200 and 300. The bonding layers 260, 310, 360 at the interfaces between the ceramic plates 200, 250, 300, 350 may cover the entire bonding surfaces as shown in FIG. 1. This is likely to be the case with adhesive bonding. Alternatively, in the case of glass frit bonding or soldering, the bonding material is preferably confined to a strip around the periphery of the bonding interface. An advantage of employing some combination of glass frit bonding, soldering and thermosonic bonding is that these techniques produce hermetically sealed joints. If multiple soldering steps are involved, then solders with successively lower reflow temperatures should be employed to avoid re-melting joints once formed.

Figure 2:
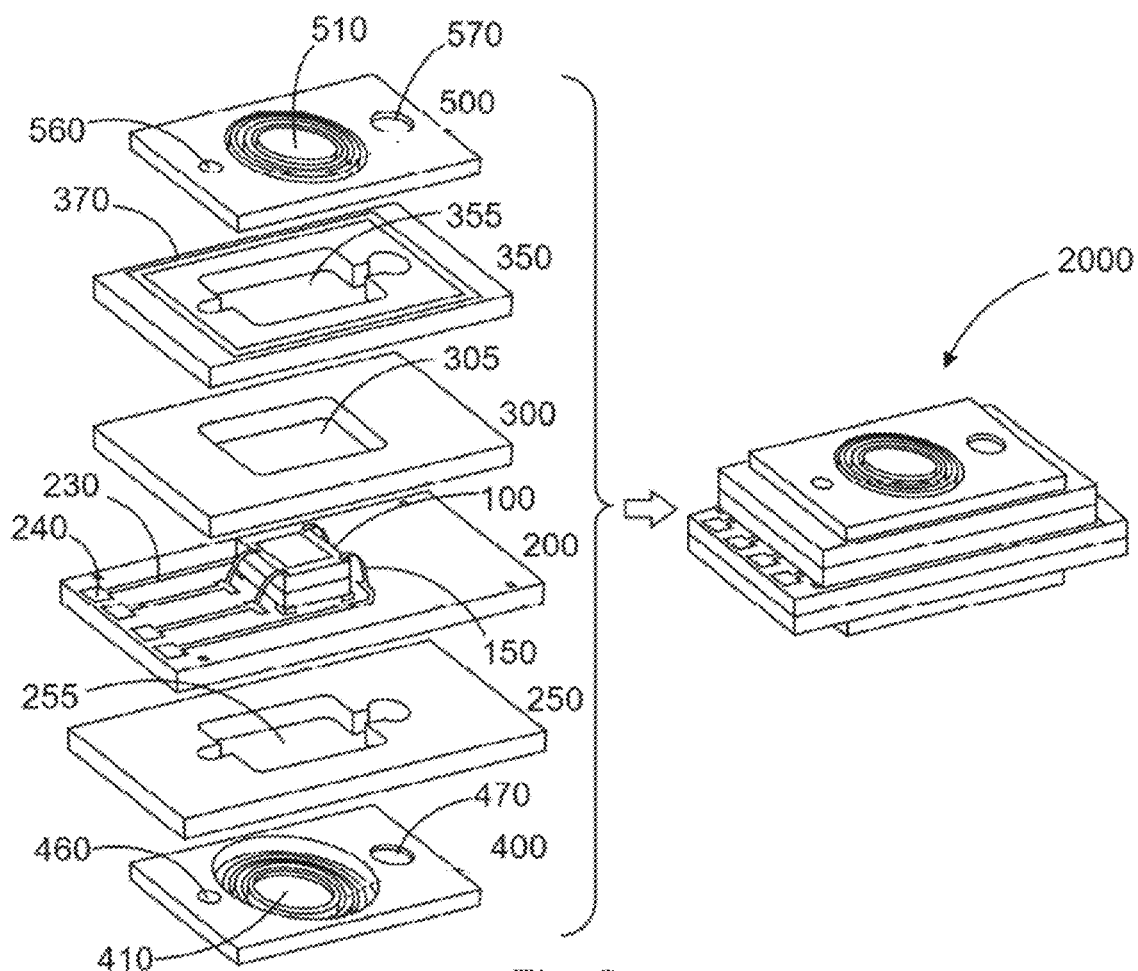
FIG. 2 is a schematic illustration of an exploded view of the sensor device of FIG. 1.

FIG. 2 shows an exploded view of the sensor device 2000 prior to filing with the hydraulic fluid, showing the shapes of the apertures 255, 305, 355 in the respective ceramic plates 250, 300, 350. Ceramic plate 250 also includes channels connecting the main aperture to additional apertures, which lie directly above the filling hole 460 and thinned region 470 on the bottom plate. Similar features are included in ceramic plate 350.

FIG. 2 also shows the arrangement of the metal tracks 230 and contact pads 240 on ceramic plate 200. It should be noted that the number of component parts can be reduced by replacing each of the lower and upper ceramic plate pairs by a single, thicker ceramic plate.

However, the upper plate in this case will need to be thicker than the height of the sensor chip 100, which is typically around 1.0 mm. It is convenient to produce the apertures in the ceramic plates by laser cutting, and commercial laser cutting processes are typically limited to material thickness of around 0.5 mm. It is therefore expedient to make up the 1.0 mm thickness by stacking two 0.5 mm-thick plates. This approach also avoids any need for blind holes in the ceramic plates.

The bottom and top plates 400, 500 are preferably attached to ceramic plates 250 and 350 by reflow soldering. Other joining methods such as thermosonic bonding or adhesive bonding can also be employed. In the case of reflow soldering, the bottom and top plates should be finished with a solderable metal layer 440, 540, and opposing solderable metal tracks 270, 370 should be provided on the ceramic plates 250 and 350. The reflow temperature of the solder used should be below the maximum service temperature of any adhesives present in the assembly and also lower than the reflow temperature of any solder used in mounting the sensor chip or bonding the ceramic plates.

The described sensor device 2000 can be used as a miniaturized wet-wet differential pressure sensor by a reduction of the diaphragm diameter to be commensurate with the sensor chip dimensions.

In order to maintain a sufficiently low diaphragm stiffness it is also necessary at the same time to reduce the diaphragm thickness. For example, when scaling a 20 mm-diameter, 20 μm-thick diaphragm down to a diameter of 4 mm, the thickness must be reduced to 2.34 μm to retain the same ratio of pressure difference to deflection.

Established state-of-the-art methods used to fabricate corrugated diaphragms for wet-wet pressure sensors are not applicable at this scale. However, batch microfabrication methods commonly used in electronics manufacturing can be applied, allowing a large number of diaphragms to be fabricated in parallel.

Figure 3:
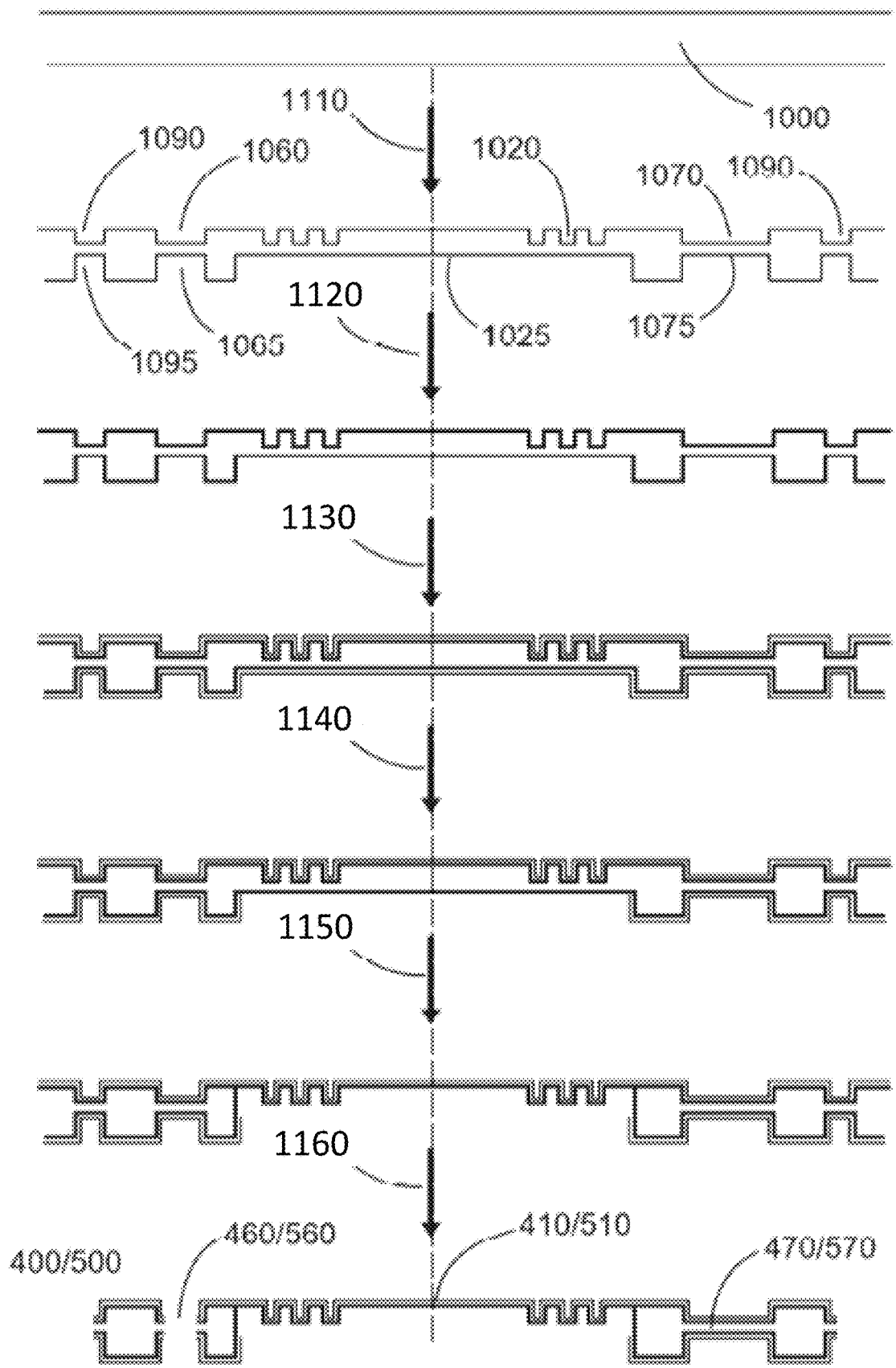
FIG. 3 is a schematic illustration of a flowchart for a method of manufacturing a corrugated diaphragm in accordance with the disclosure.

FIG. 3 sketches schematically a method for fabricating a corrugated diaphragm 410, 510, which may include a periphery area defining a bottom and a top plate 400, 500 of the sensor device 2000. The starting material is a copper substrate 1000 having a thickness greater than the proposed corrugation depth.

In a first process step 1110 standard photo-etching techniques, e.g. from microelectronic manufacturing, are used to etch several concentric circular channels 1020 into a top surface of the substrate, which are configured to define the corrugations in the diaphragm.

A circular recess 1025 covering and entire diaphragm area of the bottom or top plate 400, 500 is also etched in the bottom surface. The top- and bottom-side etch depths are controlled so that the minimum thickness of copper remaining in the diaphragm area is small but greater than zero at all sites of the substrate. Methods for such controlled-depth etching are known in the art. The top- and bottom-side etch processes are also used to produce recesses on both sides of the substrate at a site for locating the filling hole 1060, 1065 as well as a thinned region for pressure balancing 1070, 1075, together with a rectangular channel line 1090, 1095 defining a periphery of the plate.

In a second process step 1120 the etched substrate is conformally coated with a first metal layer "metal 1", e.g. by electroplating. This metal layer will form the corrugated diaphragm 410, 510 and it must therefore exhibit elastic behavior up to the maximum strain level expected in the corrugated diaphragm 410, 510. It must also be capable of acting as an etch stop for copper. Nickel satisfies both requirements and is a preferred option because electroplating of nickel onto copper is a standard process.

In a third process step 1130, a second metal layer "metal 2" can be applied on top of metal 1, e.g. by electroplating. Metal 2 can be compatible with the chosen bonding method for attaching the bottom and top plates 400, 500 to the sensor device 2000. It can also be chemically compatible with a process media to be characterized by the sensor device 2000. For the sensor device 2000 intended for use in water, gold is a preferred option because it is chemically inert and compatible with reflow soldering and a thermosonic bonding. It can also readily be electroplated onto nickel. Metal 2 can inevitably influence the mechanical properties of the diaphragm, so it should also exhibit acceptable elastic behavior.

To form the corrugated diaphragm 410, 510 it is necessary to remove the copper remaining within the bottom-side recess 1025. This may be done by removing the first metal layer and/or the second metal layer from the base of the backside recess 1025 process step 1140 and then removing the exposed copper by a chemical etching process step 1150. The first metal layer and/or the second metal layer can be conveniently removed by laser machining, using e.g. a pulsed ultraviolet laser. Alternatively, a photo-etching process may be employed.

In a next process step 1160, the material remaining between the front- and back-side hole filling recesses 1060, 1065 is removed to create the filling hole 460, 560. The material between the front- and back-side rectangular channels 1090, 1095 can also be removed to separate the plate from the fabrication substrate.

It should be noted that the process flow shown in FIG. 3 is one of a plurality of possible processes for fabricating the bottom- and top-plates. Alternative approaches would include, but not be limited to, using silicon or another material as the substrate to be patterned and depositing the metal layers by sputtering or any other vacuum deposition process. The latter would allow the use of alternative diaphragm materials such as titanium or stainless steel, which are not amenable to electroplating.

Figure 5:
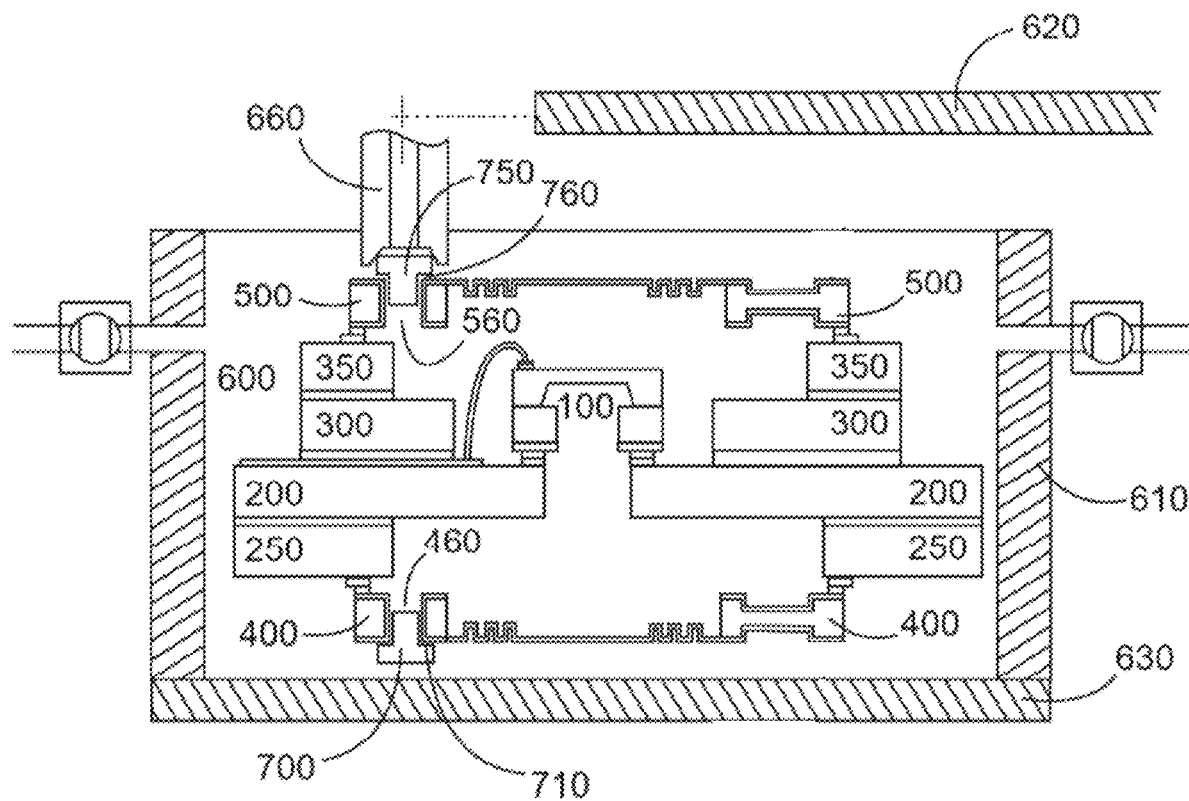
FIG. 5 is a schematic illustration of a method for sealing a cavity of a sensor device in accordance with the disclosure.

The sensor device 2000 can be filled with hydraulic fluid using methods similar to those used for conventional corrugated diaphragm type sensors. FIG. 5 schematically sketches a filling apparatus, which can comprise a vacuum chamber 610 with removable top 620 and bottom 630 plates. The chamber has a first port 640 with shut-off valve 645 connected to a vacuum pump, and a second port 650 with shut-off valve 655 connected to a reservoir of hydraulic fluid.

Starting with both valves open, with the pipe from the reservoir free of hydraulic fluid, and the fluid level in the reservoir below a reservoir outlet level, the filling chamber and reservoir are pumped down so as to de-gas the hydraulic fluid and remove air from the filling chamber and sensor cavities.

Figure 4:
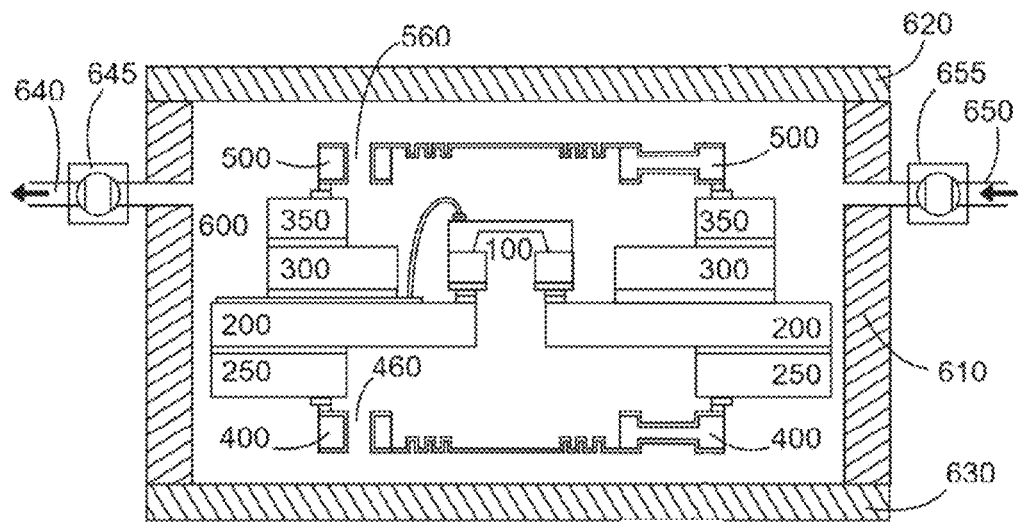
FIG. 4 is a schematic illustration of a filling of the sensor device with hydraulic fluid in accordance with the disclosure.

Once de-gassing is complete, valve 645 can be closed and the fluid level in the reservoir can raise until the fluid will flow by gravity forces from the reservoir to the filling chamber. Once the filling chamber is full of hydraulic fluid, valve 655 can be closed to isolate the filling chamber from the reservoir. FIG. 4 shows the apparatus at this stage in the process.

FIG. 5 shows a method for sealing the cavities of the sensor device 2000, which can involve thermosonically bonding metal plugs into the filling holes 460, 560 of the sensor device 2000. This thermosonically bonding can be carried out with the aid of a suitable thermosonic bonding machine, and with the open sensor device 2000 still in the filling chamber to avoid any risk of air ingress. To seal the upper cavity of the sensor device 2000, the top plate of the filling chamber can be removed, and a metal plug 750, held in the bonder pick-up tool 660, is inserted into the filling hole in the top plate. Heat and ultrasonic energy are then applied via the pick-up tool to form a thermosonic bond between a site 760 of the plug 750 and the top plate 500 of the sensor device 2000. To seal the lower cavity, the same procedure can follow, with a plug 700 and the bonding site 710, but with the filling chamber flipped, so that the lower cavity of the sensor device 2000 is at the top. Cap parts suitable for thermosonic bonding can be fabricated by the same process as bottom and top plates.

It should be noted that alternative approaches might be employed to seal the cavities, for example friction welding or soldering. Some form of an expanding plug device may also be used.

It is desirable for the initial pressures in the upper and lower cavities following the sealing process to be positive with respect to atmospheric pressure. The cavity pressures should also be balanced so that there is no initial offset on the sensor device output. The thinned regions 470 and 570 in the bottom and top plates allow for initial adjustment of the cavity pressures to ensure these requirements are met.

Figure 6A:
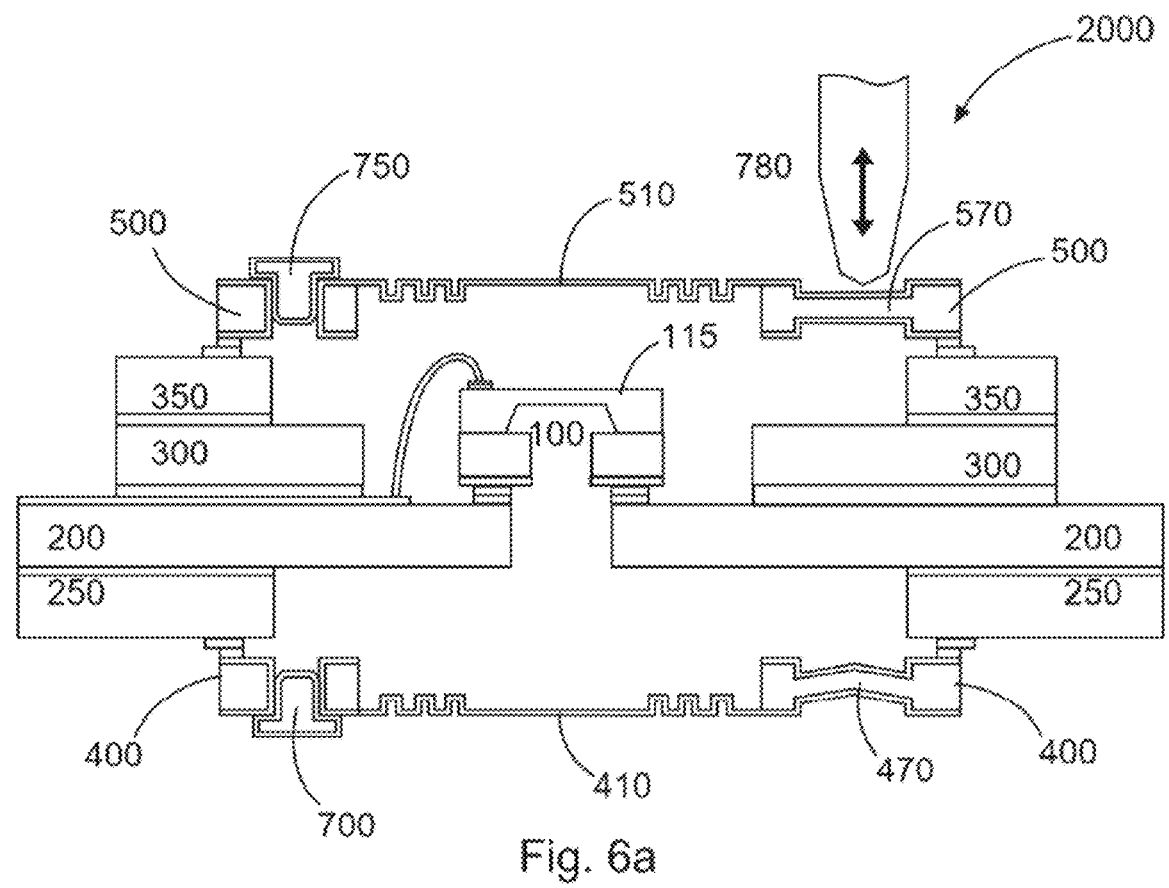
FIGS. 6a and 6b are schematic illustrations of a pressure adjustment procedure of a cavity of a sensor device in accordance with the disclosure.

FIG. 6a schematically sketches the pressure adjustment procedure for the upper cavity of the sensor device 2000. To adjust the cavity pressure, a hard tool with a suitably tapered tip is pushed against the thinned region 570 causing it to be plastically deformed. The displacement of hydraulic fluid from behind the thinned region will cause an outward deflection of the corrugated diaphragm 510 and an increase in the cavity pressure, which can be monitored via an output signal of the sensor chip 100. Assuming the initial cavity pressures are close to atmospheric pressure, the procedure is to deform the lower thinned region until the sensor chip 100 records minus the required initial pressure, and then deform the upper thinned region until the sensor chip 100 reads zero.

Figure 6B:
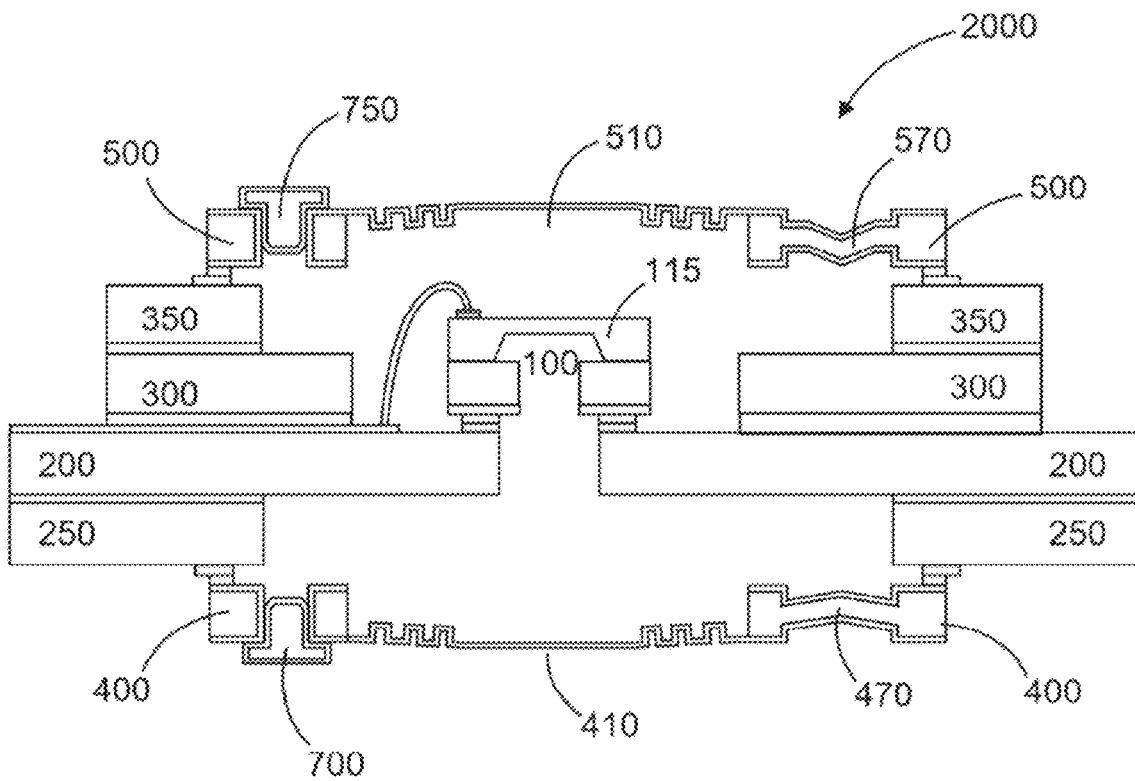

FIG. 6b schematically sketches the sensor device 2000 filled with hydraulic fluid, sealed and adjusted as described above.

In this entire description of the invention, some features are provided with counting words to improve readability or to make the assignment more clear, but this does not imply the presence of certain features.

To achieve these and other advantages and in accordance with the purpose of the invention, as embodied and broadly described herein, there is provided a sensor device for determining differential pressure in liquid or gaseous media, with a housing frame for the sensor device, comprising a first opening and a second opening and a sensing element, comprising a first side and a second side, and configured and located within the housing frame to build a first cavity at its first site and a second cavity at its second site, wherein the sensing element is configured to determine a differential pressure between the first side and the second side.

The sensor device also includes a first corrugated diaphragm and a second corrugated diaphragm, wherein the first corrugated diaphragm is configured to close the first opening to seal the first cavity of the housing frame; and the second corrugated diaphragm is configured to close the second opening to seal the second cavity of the housing frame. The sensor device also includes an inert hydraulic fluid within the first cavity and the second cavity, configured to couple an external pressure acting on the respective corrugated diaphragm to the respective side of the sensing element, wherein the first corrugated diaphragm and the second corrugated diaphragm is built by a conformal coating process using a substrate with structured surface.

A housing of the sensor device may be built by a housing frame, wherein the housing frame includes a first and a second opening, which are sealed using the first and the second corrugated diaphragm to close the housing of the sensor device.

Using other words, the sensor device is configured for pressure sensing and, in particular, differential pressure measurement in liquid or gaseous media that would be incompatible with standard silicon pressure sensor technology.

That means the sensor device relates to a miniature wet-wet differential pressure sensor ("microsensor") of the corrugated diaphragm type.

A material of the substrate with a structured surface can include copper.

The sensor device can be designed as a wet-wet differential pressure sensor and can be used for flow speed measurement within, e.g., a clean water supply network. However, the sensor device can be applied in other industrial sectors including chemical, food & beverage, automotive and aerospace.

Advantageously the sensor device can provide a total packaged volume of less than 0.2 cm3, being considerably smaller than commercially available wet-wet pressure sensors.

Reduction of the package volume can be achieved by using microfabrication methods commonly used in electronics manufacturing to fabricate the sensor device.

The sensing element of the sensor device can be a standard MEMS piezo resistive gauge/differential pressure sensor chip mounted, which can be mounted in a housing frame, which is made from, e.g. a stack of four ceramic plates. The housing frame can be built from different technologies and with different materials including stainless steel. The bottom and top plates can include and/or be a corrugated diaphragm, wherein each of the corrugated diaphragm can provide filling holes to facilitate filling of the cavities of the sensor device with hydraulic fluid. The bottom and the top plates and/or the corrugated diaphragm can include thinned regions to facilitate initial balancing of the cavity pressures during factory calibration.

Reduction of the package volume can be achieved by using microfabrication methods commonly used in electronics manufacturing to fabricate the sensor package.

According to an aspect, the substrate with structured surface is formed by a photo etch process to define the corrugations of the corrugated diaphragm.

This miniaturising of the sensor device including a wet-wet differential pressure sensor element can include a reduction in the diaphragm diameter so that it is commensurate with the sensor chip dimensions. In order to maintain a sufficiently low diaphragm stiffness it is necessary to reduce the diaphragm thickness as the diameter decreases. For example, when scaling a 20 mm diameter, 20 micron thick diaphragm down to a diameter of 4 mm, the thickness must be reduced to 2.34 micron to retain the same ratio of pressure difference to deflection.

Batch microfabrication methods commonly used in electronics manufacturing can be applied to manufacture miniature corrugated diaphragms, allowing a large number of diaphragms to be fabricated in parallel.

According to an aspect, annular channels within the substrate with structured surface, which define the corrugations of the corrugated diaphragm, are laser-machined for smoothing corners of the annular channels.

Advantageously the smoothing of the corners of the annual channels can improve the reliability and the stability of the corrugated diaphragm.

According to an aspect, the respective corrugated diaphragm includes a filling hole to facilitate filling of the respective cavities with hydraulic fluid.

Because the filling hole can be an integrated part of the corrugated diaphragm, mounting the sensor device is simple, because the housing frame can be constructed easily without additional filling hole to provide the hydraulic fluid to the cavities of the sensor device.

According to an aspect, the respective corrugated diaphragm comprise an adjustment window to facilitate initial balancing of the cavity pressures during factory calibration.

Advantageously to include the adjustment window to the corrugated diaphragm simplifies the construction of the sensor device, because only the corrugated diaphragm needs to be structured using a miniaturised method.

According to an aspect, a diameter of the corrugated diaphragm is smaller than 1 cm, preferably smaller than 20 mm, most preferably smaller than 4 mm.

Building a sensor device with the diameter of the corrugated diaphragm of this size enables very small sensor devices, which improves the usability of these small sensor devices.

According to an aspect, the material of the corrugated diaphragm comprise a metal sheet, wherein the metal sheet is preferably made of gold and/or nickel and/or titanium and/or stainless steel.

Advantageously, adaptation of the material of the corrugated diaphragm enables a user to choose the material according to specific needs from the application of the sensor device.

According to an aspect, the metal sheet is made using a sputtering process and/or vacuum deposition process and/or an electroplate process.

Using different methods for deposition of the metal layer enables sensor devices with different materials for the corrugated diaphragm.

According to an aspect, a first volume of the first cavity and a second volume of the second cavity is configured to be of similar size, to minimise a thermal drift of the sensor device due to thermal expansion of the hydraulic fluid.

According to an aspect, the housing frame is built by a stack of ceramic plates, each comprising an aperture to build the respective cavities.

By using a stack of ceramic plates, it is possible to produce the individual ceramic plate by laser cutting, because laser cutting is limited in respect to the thickness of the ceramic plates to be cut.

According to an aspect, the sensing element is mounted at an aperture of one of the ceramic plates of the stack of ceramic plates.

Mounting the sensing device on one of the ceramic plates improves the manufacturability because it improves the stability of the sensing device during manufacturing.

The sensor device can include a sensor chip silicon microelectromechanical system (MEMS) device as the sensing element. The sensing element can be a standard MEMS piezo resistive gauge/differential pressure sensor chip comprising a silicon die.

According to an aspect, a method for manufacturing a corrugated diaphragm is proposed, including the following steps: in one step, a metal substrate is photo-etched on both sides for building a substrate with structured surface to define corrugations of the corrugated diaphragm by a conformal coating process. In a further step, at least one sides and preferably both sides of the substrate with structured surface is/are conformally coated with a first metal sheet; in a further step, the at least one first metal sheet is removed from a backside of the substrate. In a further step the metal substrate is removed, which is exposed after removing the at least first metal sheet from the backside of the metal substrate, from the at least first metal sheet of the front side of the metal substrate, to build the corrugated diaphragm.

According to an aspect, the first metal sheet at the substrate with structured surface is conformally coated with a second metal sheet on both sides of the substrate with structured surface, following the step of conformally coating a substrate with structured surface with the first metal sheet.

According to an aspect, the method for manufacturing a corrugated diaphragm includes a step of laser-machining annular channels, which are photo-etched within the metal substrate to define the corrugations of the corrugated diaphragm, for smoothing corners of the annular channels, before the first metal layer conformally codes both sides of the substrate with structured surface.

According to an aspect, the method for manufacturing a corrugated diaphragm includes the step of building a filling recess within the corrugated diaphragm.

According to an aspect the first metal sheet and/or any additional metal sheet is conformal coated by an electroplating process.

Preferably, the first metal sheet and/or the second metal sheet is conformally coated by an electroplating process.

According to an aspect, a method for sealing a cavity of a sensor device for determining differential pressure in liquid or gaseous media is proposed, wherein the sensor device comprises a corrugated diaphragm with a filling hole for providing hydraulic fluid to the cavity including the following steps.

In one step, the sensor device is placed into a filling chamber, for filling the cavity with the hydraulic fluid, wherein the filling chamber is filled with the hydraulic fluid to completely cover the sensor device. In a further step a metal plug is provided, which is configured to seal the filling hole of the corrugated diaphragm. In a further step, the metal plug is bonded to the filling hole of the corrugated diaphragm, using a thermosonically bonding process, to seal the cavity of the sensor device. As used herein, the term thermosonically is meant to describe a bonding process that uses both thermal and ultrasonic energy to bond structures to one another.

The hydraulic fluid, which is included in the sensing device, can include silicon oil.

According to an aspect, the metal plug of the method for sealing a cavity of the sensor device includes a copper wire, which is tin plated with solder.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A sensor device for determining differential pressure in liquid or gaseous media, comprising:
   a housing frame for the sensor device, the housing frame including a first opening and a second opening;
   a sensing element, the sensing element including a first side and a second side, the sensing element disposed within the housing frame to define a first cavity at its first side and a second cavity at its second side, wherein the sensing element is configured to determine a differential pressure between the first side and the second side;

a first corrugated diaphragm and a second corrugated diaphragm, the first corrugated diaphragm being configured to close the first opening to seal the first cavity of the housing frame, the second corrugated diaphragm being configured to close the second opening to seal the second cavity of the housing frame;

an inert hydraulic fluid disposed within the first cavity and the second cavity, the inert hydraulic fluid fluidly coupling an external pressure acting on the respective corrugated diaphragm to the respective side of the sensing element;

wherein the first corrugated diaphragm and the second corrugated diaphragm is built by a conformal coating process using a substrate with structured surface.

2. The sensor device according to claim 1, wherein the substrate with structured surface is formed by a photo etch process to define corrugations of the corrugated diaphragm.

3. The sensor device according to claim 2, wherein annular channels within the substrate with structured surface, which define the corrugations, are laser-machined for smoothing corners of the annular channels.

4. The sensor device according to claim 1, wherein the respective corrugated diaphragm comprises an adjustment window to facilitate initial balancing of the differential pressure during factory calibration.

5. The sensor device according to claim 1, wherein a diameter of the corrugated diaphragm is sized in a range between 4 millimeters (mm) and 20 mm.

6. The sensor device according to claim 1, wherein a material of the corrugated diaphragm comprises a metal sheet, and wherein the metal sheet is made of gold and/or nickel and/or titanium and/or stainless steel.

7. The sensor device according to claim 6, wherein the metal sheet is made by a sputtering process and/or vacuum deposition process and/or an electroplate process.

8. The sensor device according to claim 1, wherein a first volume of the first cavity and a second volume of the second cavity are configured of similar size to minimize a thermal drift of the sensor device due to thermal expansion of the hydraulic fluid.

9. The sensor device according to claim 1, wherein the housing frame is built by a stack of ceramic plates, each of the stack of ceramic plates comprising an aperture that defines at least a portion of the first and second cavities.

10. The sensor device according to claim 9, wherein the sensing element is mounted at an aperture of one of the ceramic plates of the stack of ceramic plates.

11. A method for manufacturing a corrugated diaphragm, comprising:

photo-etching a metal substrate on both sides for building a substrate with a structured surface to define corrugations of the corrugated diaphragm by a conformal coating process;

conformally coating both sides of the substrate with structured surface with a first metal sheet;

removing the at least one first metal sheet from a backside of the metal substrate;

removing the metal substrate, which is exposed after removing the at least first metal sheet from the backside of the metal substrate, from the at least first metal sheet of the front side of the metal substrate, to build the corrugated diaphragm.

12. The method according to claim 11, further comprising laser-machining annular channels, which are photo-etched within the metal substrate to define the corrugations of the corrugated diaphragm, for smoothing corners of the annular channels.

13. The method according to claim 11, wherein the first metal sheet and/or any additional metal sheet is conformal coated by an electroplating process.

14. A method for sealing a cavity of a sensor device for determining differential pressure in liquid or gaseous media, wherein the sensor device comprises a corrugated diaphragm with a filling hole for providing hydraulic fluid to the cavity, the method comprising:

placing the sensor device into a filling chamber, for filling the cavity with the hydraulic fluid, wherein the filling chamber is filled with the hydraulic fluid to completely cover the sensor device;

providing a metal plug configured to seal the filling hole of the corrugated diaphragm; and bonding the metal plug to the filling hole of the corrugated diaphragm using a thermosonically bonding process, to seal the cavity of the sensor device.

15. The method according to claim 14, wherein the metal plug comprises a copper wire that is tin plated with solder.

\* \* \* \* \*